May 11, 1965 J. R. THOMPSON ETAL 3,182,549

CARD REPRODUCING DEVICE

Filed Sept. 15, 1961 6 Sheets-Sheet 1

*INVENTOR.*
JAMES R. THOMPSON,
BY STUART E. HOTCHKISS and
LEROY C. KLEIST
Lockwood, Woodard, Smith & Weikart
Attorneys

CARD REPRODUCING DEVICE

Filed Sept. 15, 1961 6 Sheets-Sheet 2

INVENTOR.
JAMES R. THOMPSON,
STUART E. HOTCHKISS and
LEROY C. KLEIST
BY Lockwood, Woodard, Smith & Weikart
Attorneys INVENTOR.
JAMES R. THOMPSON,
STUART E. HOTCHKISS and
LEROY C. KLEIST
BY
Lockwood, Woodard, Smith & Weikart
Attorneys May 11, 1965 J. R. THOMPSON ETAL 3,182,549

CARD REPRODUCING DEVICE

Filed Sept. 15, 1961 6 Sheets-Sheet 4

INVENTOR.
JAMES R. THOMPSON,
STUART E. HOTCHKISS and
LEROY C. KLEIST
BY
Lockwood, Woodard, Smith & Weikart
Attorneys INVENTOR.
JAMES R. THOMPSON,
BY STUART E. HOTCHKISS and
LEROY C. KLEIST Lockwood, Woodard, Smith & Weikart
Attorneys INVENTOR.
JAMES R. THOMPSON,
STUART E. HOTCHKISS and
LEROY C. KLEIST
BY
Lockwood, Woodard, Smith & Weikart
Attorneys

United States Patent Office 3,182,549
Patented May 11, 1965

3,182,549

CARD REPRODUCING DEVICE

James R. Thompson, Urbana, Ill., Stuart E. Hotchkiss, Princeton, N.J., and Leroy C. Kleist, Ogden, Ill., assignors to The Magnavox Company, Fort Wayne, Ind., a corporation of Delaware Filed Sept. 15, 1961, Ser. No. 138,741
16 Claims. (Cl. 88—24)

This invention relates generally to filing systems utilizing small sized photographic film segments, hereinafter called cards, and more particularly to a device for removal of cards from a conveyor in a card handling machine, disposing a card so removed for copying by a reproducing machine, and returning the card to the conveyor.

It is known in the art to establish filing systems using small film records (cards) of documents whereby it is unnecessary to keep files of the original full-sized paper documents. Various systems of storing documentary information on micro-film have been devised. Certain of these which operate almost completely automatically, require complicated and expensive equipment. In an effort to simplify the equipment involved in such systems, various inventions have been made including a Card Transport System disclosed in the application of Donald E. Craig, Serial No. 67,825, filed on November 7, 1960, a Card Feeding Device disclosed in the application of Stuart E. Hotchkiss et al., Serial No. 138,742, filed on September 15,1961, now U.S. Patent No. 3,137,496, and a Card Receiving Device disclosed in the application of James R. Thompson et al., Serial No. 117,723, filed on June 16, 1961. These applications disclose means for transporting cards on a conveyor, means for feeding cards from a storage container or capsule to the conveyor, and means for removing cards from the conveyor and returning them to the storage capsule.

In addition to the means disclosed in the aforementioned applications, and in order to effect the principal purpose of the card handling system, it was necessary to provide an efficient, reliable and relatively inexpensive means whereby selected ones of the cards stored in a capsule may be conveniently reproduced and then returned to the capsule for storage. Cards could then be removed from the capsule, place upon a conveyor by a feeding device, reproduced by the station disclosed herein, and then removed from the conveyor for return to the storage capsule.

It is, therefore, a general object of this invention to provide means for reproduction of selected cards in an automatic card handling or data processing system.

It is a further object of this invention to provide means whereby selected cards may be removed from a high speed conveyor, disposed for individual treatment such as projection and reproduction thereof, and then returned to the conveyor.

It is a still further object of this invention to provide means for achieving the foregoing objects and adapted to produce reproductions many times larger than the card.

It is a further object of this invention to provide means for achieving the foregoing objects in cooperation with conventional reproduction equipment.

It is a still further object of this invention to provide means whereby a card removed from a high-speed conveyor can be moved at a controlled speed for progressive reproduction of portions thereof in synchronism with a progressive type of reproducing machine.

It is a still further object of this invention to provide means for achieving the foregoing objects in which the time that the card is away from the conveyor is minimized.

It is a still further object of this invention to provide means for accomplishing the foregoing objects wherein the handling of the card is conducive to a long useful life of the card.

It is a still further object of this invention to provide means for accomplishing the foregoing objects and occupying a minimum of space.

It is a still further object of this invention to provide means for achieving the foregoing objects and having characteristics of simplicity, durability and nominal expense.

Related objects and advantages of the invention will become apparent as the description proceeds.

This invention includes in its scope a card reproducing station or device which can be appreciated most readily if the environment in which it is used is first described. A card transporting conveyor is provided and has a station for feeding cards to the conveyor belts, a station for reading cards as they are carried along by the conveyor belts and pass the reading station, the reproducing station of this invention, and the card receive station to remove cards from the conveyor belts. The reproducing station of this invention includes a solenoid actuated ramp which responds to a first electrical signal produced by the reading station when it recognizes a card to be reproduced. The ramp descends between the belts and intercepts the desired card when it reaches the lowered ramp end. The card is then diverted from the transport belts and carried by its inertia into a carriage in the reproducing device.

The carriage guides the card in its forward motion by engagement with the edges of the card along its length until the card contacts the arm of a switch. The kinetic energy of the card is absorbed by the switch arm as the card depresses the arm, causing the switch to transmit an electrical "start of scan" signal. The switch arm is mechanically biased to return to its original position and moves the card in a direction opposite to that of its entry into the carriage. The carriage is constructed and arranged such that the card being so moved by the switch arm is stopped by a portion of the carriage while there is yet a slight load on the card exerted by the switch arm. The card is then disposed with its trailing edge abutting the stop in the carriage and with the spring-loaded switch arm against its leading edge.

The "start of scan" signal activates means whereby the card is held flat in the carriage and whereby the carriage with the card therein is caused to move at a predetermined speed in synchronism with the drum of the Xerographic reproducing machine. The card is illuminated and, by appropriate arrangement of optics, the information on the card is projected to the drum of the reproducing machine as the carriage is moved along.

When the carriage has moved a sufficient distance to permit projection of the information thereon to the drum, the carriage drive is disconnected and the carriage is returned to its initial "home" position by spring action. If a second reproduction of the same card is required, the carriage will again be moved from "home" in synchronism with the drum, as for the first reproduction.

When the desired number of reproductions have been made and the carriage has returned to "home," the card is discharged from the carriage to the conveyor belts and carried away to a card receive station.

The full nature of the invention will be understood from the accompanying drawings and the following description and claims:

Figure 1:
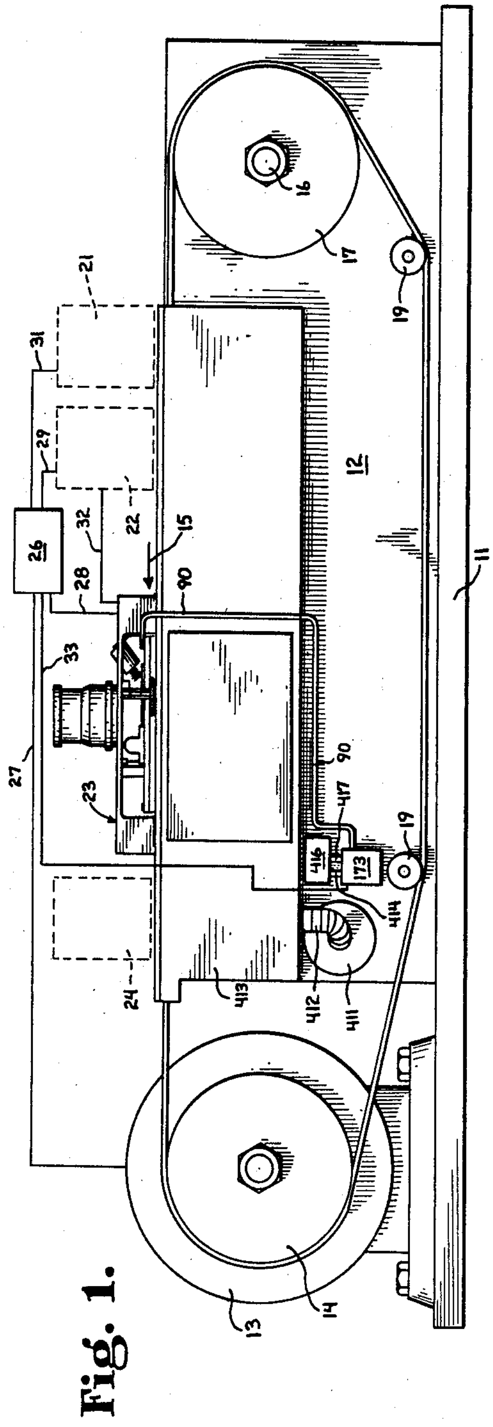
FIG. 1 is a side elevation of a conveyor or card transport system incorporating the reproducing device according to the present invention.
Figure 2:
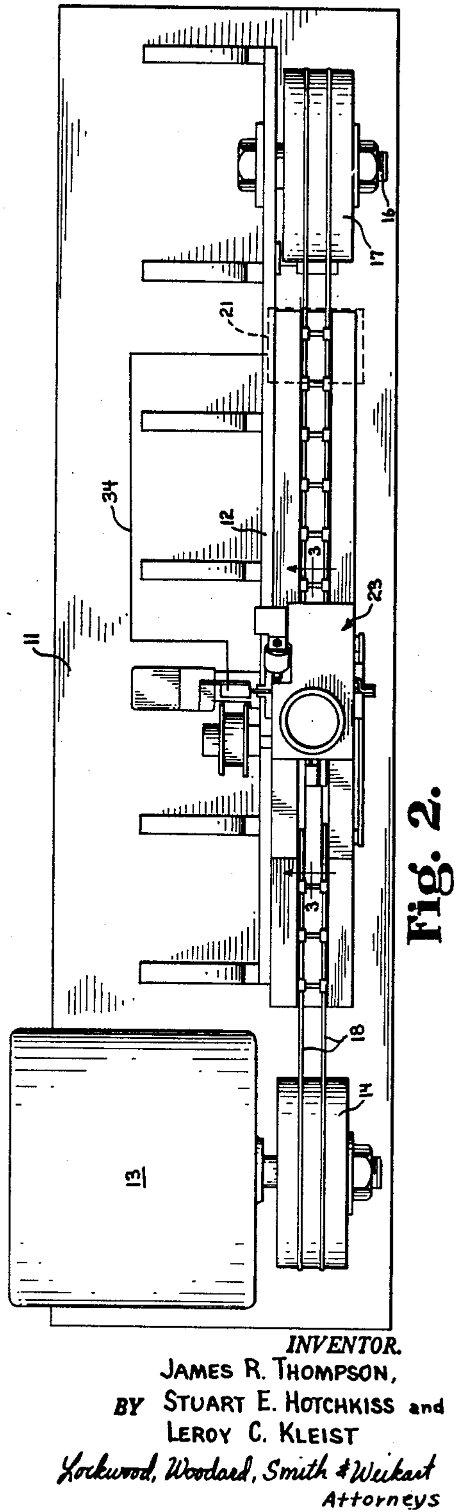
FIG. 2 is a top plan view of the system shown in FIG. 1.

Referring to FIGS. 1 and 2, foundation plate 11 carries an upright 12 affixed thereto. Plate 11 provides a support for the motor 13 driving a pulley 14. The upright 12 provides a support for the shaft 16 carrying the pulley 17. A pair of belts 18, carried by the pulleys 14 and 17, is driven by pulley 14 in the direction of arrow 15. Suitable idlers 19 are provided for the belt.

Cards may be delivered to the belt from a feeding device indicated by the dotted outline 21, which, as indicated heretofore, is disclosed in the aforementioned application of Hotchkiss, et al., the disclosure of which is incorporated herein insofar as is necessary to amplify this disclosure. The cards are retained to the belt by a vacuum system as disclosed in the aforementioned application to Craig, the disclosure of which is also incorporated herein by reference insofar as is necessary to amplify this disclosure. The system is designated schematically in FIG. 1 by the high volume vacuum pump 411 having its suction line 412 coupled to a plenum 413 situated below the belts and fastened to the upright 12.

A high-vacuum, low-volume pump 416, is also provided, having an intake line 417 and an exhaust line 414 coupled to solenoid valve 173. The solenoid valve assembly 173 may be, for example, a Type DA–31 made by the Mercoid Corporation of Chicago, Illinois. Valve 173 has another line 90 attached to it and is capable of coupling either pressure line 414 or vacuum line 417 to the line 90, for purposes which will become apparent as the description proceeds.

In addition to the feeding device 21, there are additional stations disposed at various locations along the conveyor and including a card reading station 22, a card reproducing station 23, with which this application is concerned principally, and a card receiving station 24 such as that shown and described in the aforementioned application of Thompson, et al., the disclosure of which is also incorporated herein by reference insofar as is necessary to amplify this disclosure. Many code reading devices are known to those skilled in the art and can be adapted to perform the function of reading station 22. An example may be found in an article entitled "IR Cells Read Coded Films," appearing in Electronic Design, August 19, 1959. A control center 26 may also be provided in any manner suitable to perform conventional functions such as, for example, indicating to the card reading station the specific cards which are to be duplicated and establishing the number of reproductions to be made for each card. The electrical couplings of the control center to the various stations are represented schematically by the lines designated by reference numbers 27, 28, 29, 31, 32, and 33.

The detailed construction of the card reproducing station of this invention will be more readily appreciated by referring to the FIGS. 3, 4, 5, and 6 as well as referring to FIGS. 1 and 2 for purposes of understanding the relationship of the reproducing device to the card transport system.

Figure 3:
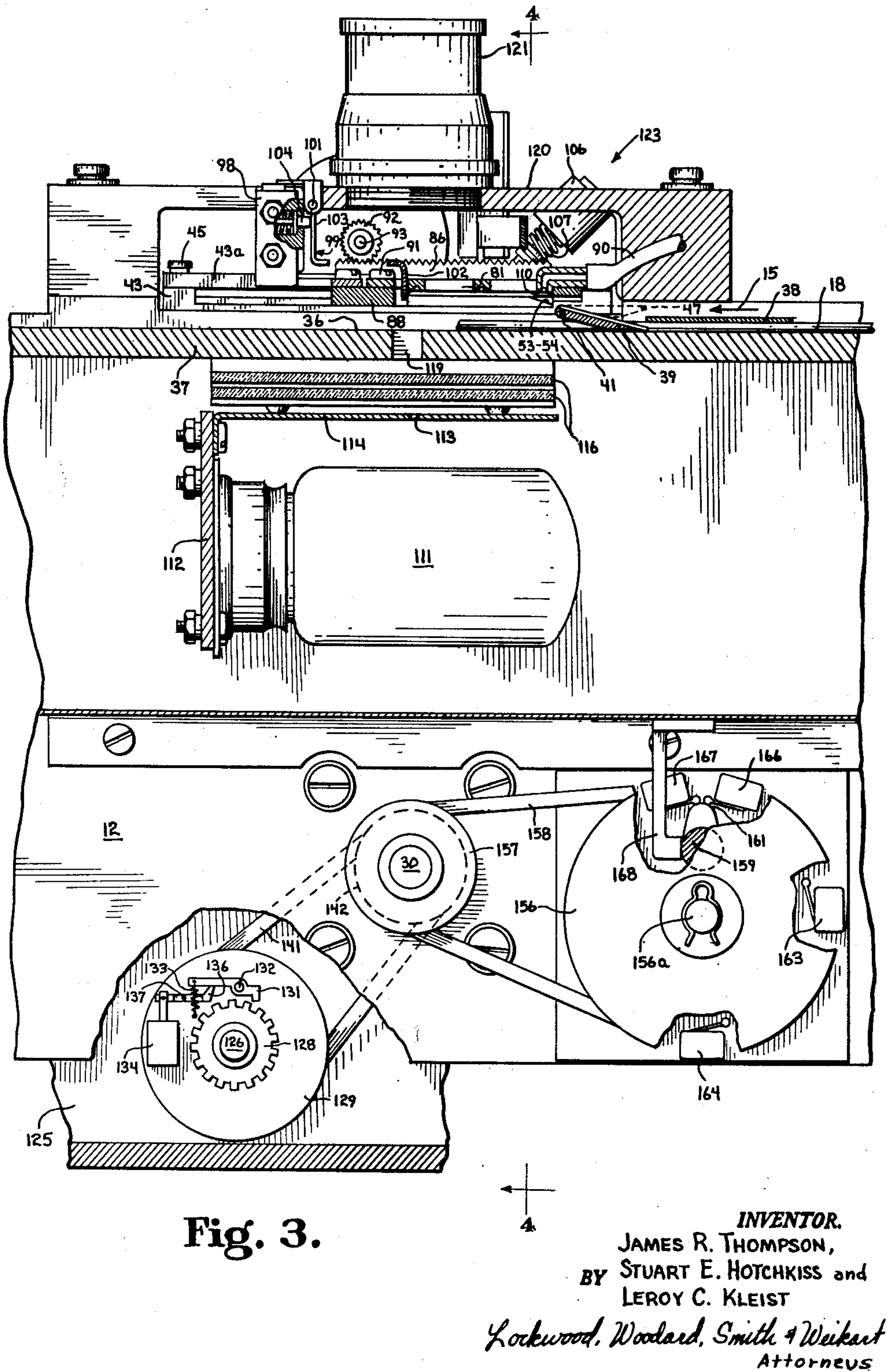
FIG. 3 is an enlarged fragmentary section taken along the lines 3—3 in FIG. 2.

In FIG. 3, belt 18 is shown resting on upper surface 36 of the belt guide track 37. A card 38 is shown resting on the belt. The reproducing station includes a ramp 39 pivotally mounted by means of the shaft 41 to the two base plates 42 and 43 which are affixed, as by the screws 44 and 46, to the belt guide track 37. The ramp is shown in its depressed position whereby it is able to pick up a card 38 moving along on the belts 18 in the direction of arrow 15. An alternate and inactive position of the ramp 39 is illustrated by the dotted outline designated by reference numeral 47. A pair of gates 48 and 49, is provided and the gates are mounted on the base plates 42 and 43 in such a manner as to be laterally slidable so as to increase the space between their inner edges 51 and 52. Positioning strips 42*a* and 43*a* are fastened to the plates 42 and 43 respectively by screws 45. The forward portion of each of the gates is provided with an incline 53, 54 whereby a card ascending ramp 39 can easily continue along the forward portion of the gates and move toward the rear portions thereof.

Gate actutaors 56 and 57 are provided with key-like projections 58, 59 which extend into longitudinal recesses 61 and 62, respectively, of the gates 48 and 49, respectively. The gate actuator 57 is connected by a pin 63 to the L-shaped crank 64 which is connected by pin 66 to the plunger 67 of the gate solenoid 68.

Figure 4:
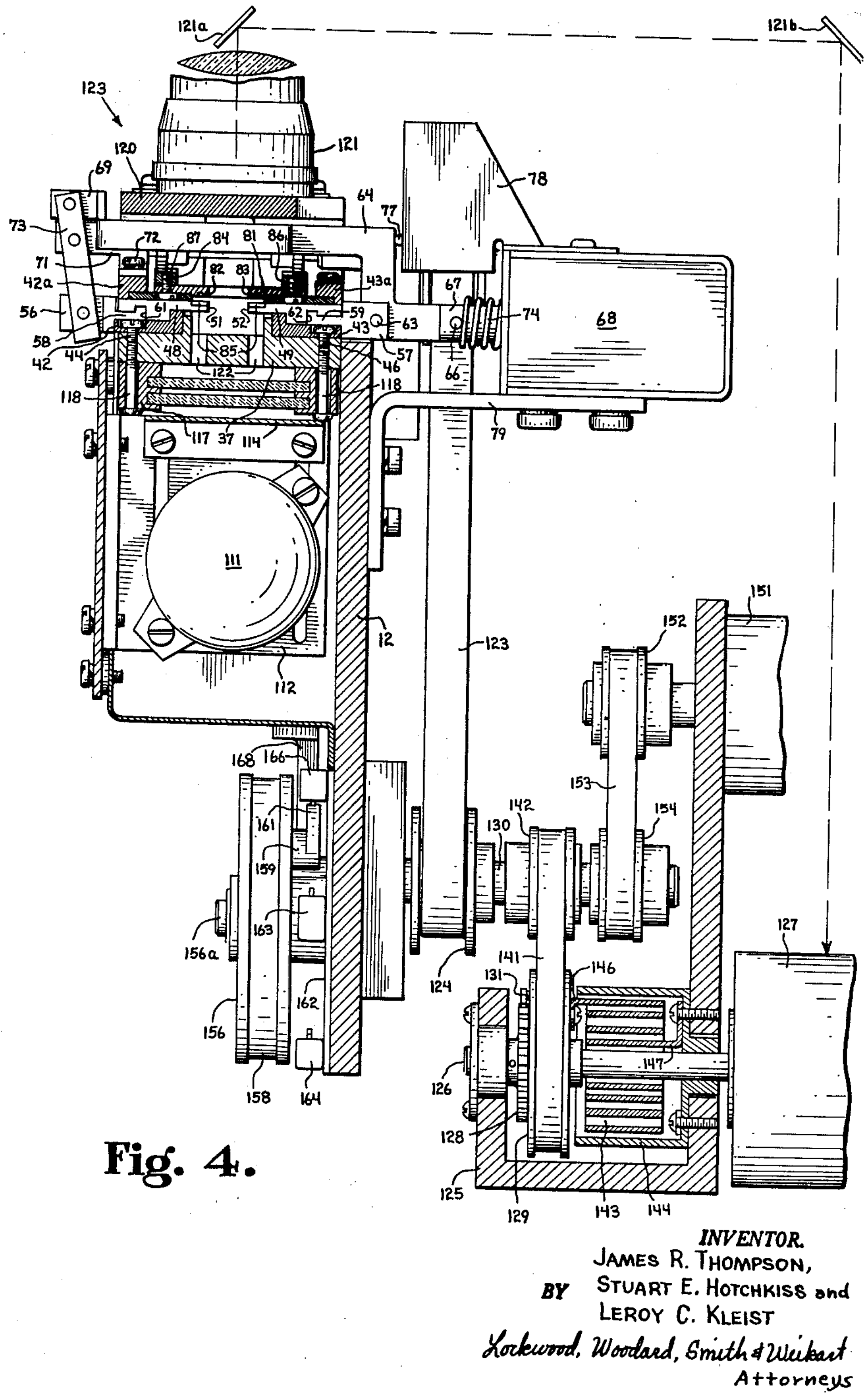
FIG. 4 is a fragmentary transverse section taken along the lines 4—4 in FIG. 3.

An offset link 69 is fastened to the L-shaped crank 64. A pivot arm 71 is fastened by means of the screw 72 to the positioning strip 42*a*. A pivot link 73 is connected by pins to the gate actuator 56, the pivot arm 71 and the offset link 69 whereby the motion caused by actuation of the solenoid produces a reverse motion in the gate actuator 56. A gate solenoid return spring 74 is provided whereby the gates are positioned as shown in FIG. 4 except when the gate solenoid 68 is actuated separating the inner edges of the gates. A feed inhibiting switch 76 having an actuating member 77 engaged with the crank 64, is mounted by any suitable means such as, for example, the bracket 78 to the gate solenoid 68 which is mounted in turn by a bracket 79 to the upright 12. This switch is electrically connected as by conductor 34, to the feeding station to prevent feeding of a card by the feed station at any time the gates are open.

A platen 81 is provided having portions 82 and 83 disposed directly above the gates 48 and 49, respectively. Portions of a groove 85 in the bottom of the platen can be seen also, the general configuration of which can be more readily observed in FIG. 7. The platen also has gear racks 84 and 86 fastened thereto as by screws 87, for example. There is disposed between the outer portions of the platen and the upper faces of the gates, a card guide plate 88. This plate rests on the base plates 42 and 43 and is confined laterally and vertically by the positioning strips 42*a* and 43*a*. The plate constitutes a carriage frame and serves to guide and confine the side edges of a card in the carriage, to provide a depending abutment 110 for use as a card stop as will become apparent, to provide a mounting means for the platen, and to move longitudinally precisely within the bounds provided by the positioning strips and base plates as a card is being scanned.

The platen is securely mounted to the card guide plate by means of the screws 91. Flexible tubing 90 is attached to the forward end of the platen to communicate a vacuum or pressure, as determined by valve 173, to the slot 85 in the bottom face thereof.

Rack drive pinions 92 are mounted to a shaft 93 and are continuously engaged with the racks 84 and 86. The outer end of shaft 93 is carried in ball bearing 94 and the inner end of the shaft is supported by bearing block 96. The drive shaft 93 is driven by a pulley 97.

Figures 5, 11, 12:
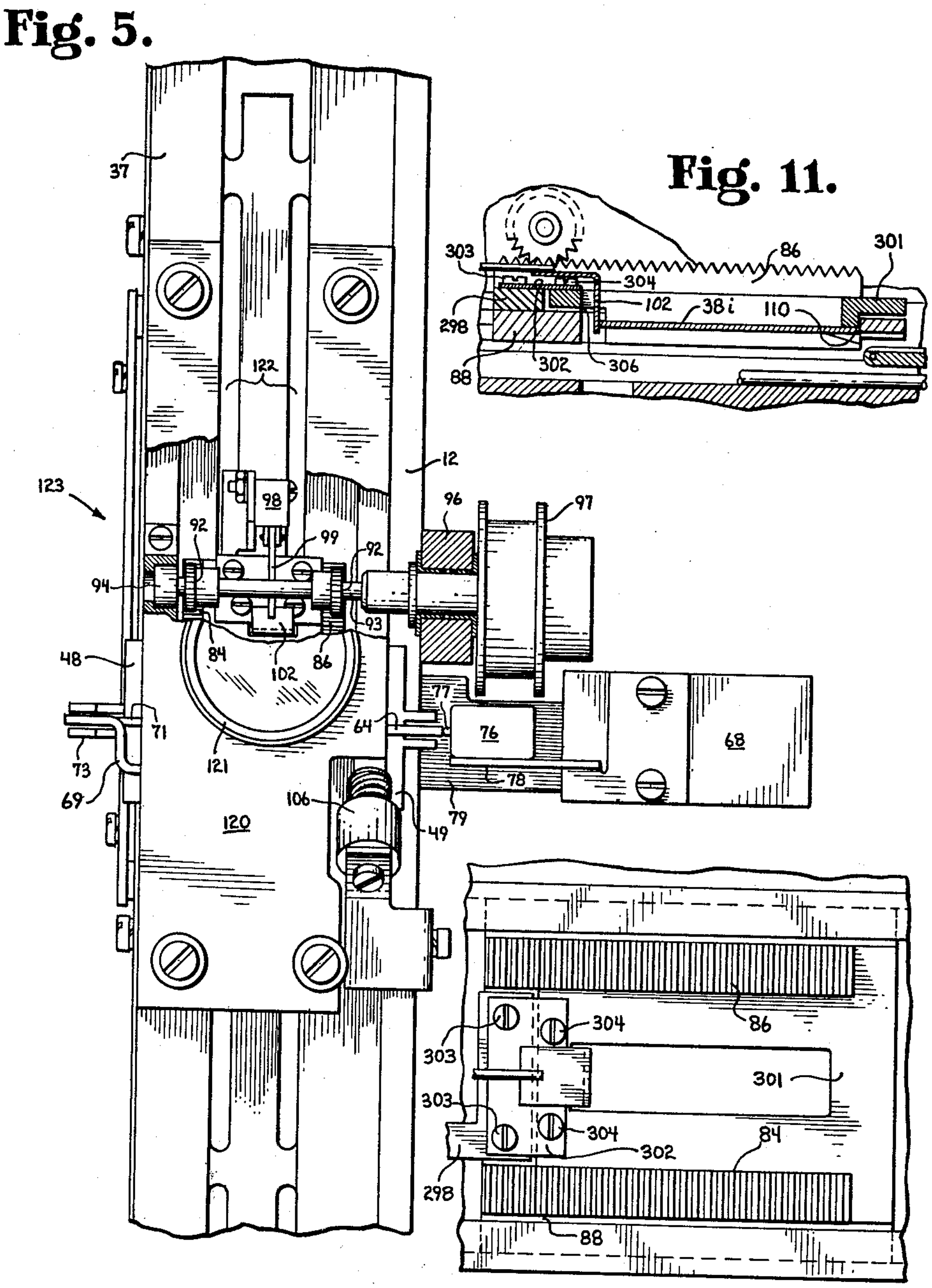
FIG. 5 is a fragmentary enlarged plan view.
FIG. 11 is an enlarged fragmentary section similar to FIG. 3 and showing a second embodiment of the card holding portion of the carriage.
FIG. 12 is a fragmentary enlarged plan view of the embodiment of FIG. 11.

A scan starting switch 98 is mounted to the card guide plate 88 and has an operating arm 99 pivotally mounted at the pin 101 and having a broad metal "pad" 102 at the forward end thereof which descends to a location shown particularly well in FIGS. 3 and 5. The upper end of the arm 103 operates a spring-loaded plunger 104 of the switch 98.

Figure 6:
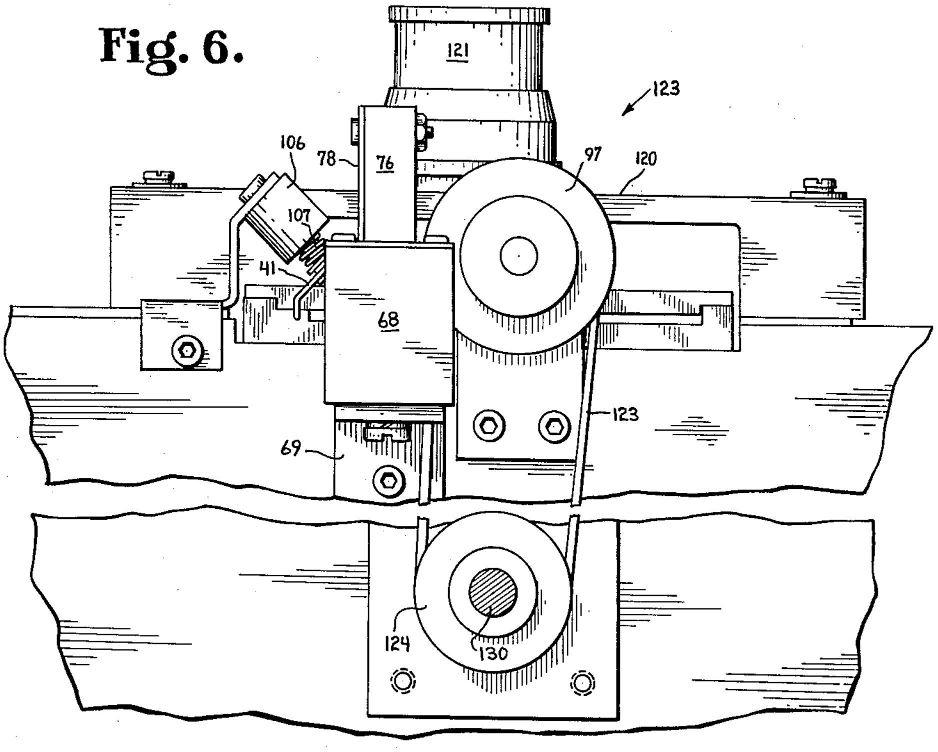
FIG. 6 is an enlarged fragmentary side elevation.

The ramp solenoid 106 is provided with a return-spring 107 whereby it keeps the ramp 39 in the position 47 normally. FIG. 6 illustrates the connection of the ramp shaft 41, which may actually be a spring-wire, to the plunger of solenoid 106.

A source of light is provided by means of the lamp 111 which is mounted by way of the bracket 112 to the upright 12. The lamp, which may be, for example, a Sylvania True-Focus unit, produces parallel light in an upward direction. The light produced by the lamp 111 is permitted to pass upwardly through a slit-shaped aperture 113 in the aperture plate 114. A pair of spaced, heat-dissipating glass plates 116, is disposed above the aperture plate and these plates 116 are maintained in spaced relation by the mounting member 117 fastened to the underside of the belt guide track 37 by means of the screws 118. These plates protect the film cards from heat. An opening 119 is provided through the guide-track 37 above the aperture 113 so as to admit light to the area in the carriage where a card to be reproduced will be located.

A lens 121 fastened to the lens mount 122 is disposed above the opening 119 and is available thereby to project light originating at the lamp 111 and passing through a card such as card 38 when positioned in the carriage.

It should be noted that, at all times, a vacuum is maintained under the belt guide track 37 by pump 411 and is communicated to the area of the belts by means of the slots 122 in the track.

As illustrated in FIG. 4, the drive for the pulley 97 is provided through a belt 123 driven by the pulley 124 fastened to shaft 130. Inasmuch as belt slippage cannot be tolerated if synchronism of the carriage drive with the copying machine is to be achieved, the belts mentioned herein are of the positive drive type used in timing applications. Drive for pulley 124 is obtained by coupling to the driving system of a conventional copying machine of the progressive or scanning type.

An example of a suitable machine is the Xerox Model 914 Office Copier produced by Haloid Xerox, Inc. of Rochester, New York. This machine conventionally produces copies of documents by xerography, in a manner well known to those skilled in the art. When the machine is used in conventional manner, the document to be copied is stationary and an illuminating lamp and lens system are moved in synchronism with the drum of the machine to "scan" the document in the reproduction process. The reproduction is the full size of the document to be reproduced. When used with the present invention, however, the lamp, document holder, and moving lens system are dispensed with, as the present invention projects the documentary information from the film card to the drum of the machine.

The terms "continuous process" and "progressive" are used from time to time with reference to the copying or reproducing process, to designate a process whereby a portion of the image to be reproduced is presented to a portion of a photoconductively sensitized drum or sensitized paper or the like to which it is to be transferred, and the image receiving medium progresses until the entire image from one end to the other has been impressed on the receiving medium. This is to distinguish from a process wherein the entire image to be transferred is impressed on the entire receiving medium substantially instantaneously, such as in direct photographic copying.

Obviously, machines other than xerographic machines employ continuous processes and may therefore be used according to this invention. For example, the Smith-Corona-Marchant Model 33 office copier may be used.

In FIGS. 3 and 4, a portion of the frame of the copying machine is designated by reference number 125. Shaft 126 is driven continuously and at constant speed by drive mechanism (not shown) in the copying machine. It, therefore, drives the drum 127 continuously and at constant speed. The light path from the lens 121 to drum 127 includes mirrors 121a and 121b. A ratchet wheel 128 is fastened to the shaft 126 and is accordingly a constantly rotating member.

A drive pulley 129 is mounted on shaft 126 but is rotationally free with respect to the shaft, so that it may normally remain stationary as the shaft rotates. A pawl 131 is pivotally mounted to pulley 129 by means of pin 132. The pawl is held normally disengaged from the ratchet wheel by means of return spring 133.

A scan starting solenoid 134 is fixed to pulley 129 and is coupled to the pawl by means of lever 136 mounted to pulley 129 by pin 137. Actuation of the solenoid can thus engage the pawl with the ratchet wheel to initiate rotation of drive pulley 129 with shaft 126. Pulley 129 drives pulley 124 by means of belt 141 and pulley 142 fastened to the shaft 130. Pulley 97 drives the carriage for scanning of a card in the carriage.

A scan return torsion spring 143 coiled in the form of a clock spring is disposed in the housing 144 which is fastened to frame 125. One portion of the spring, such as outer winding 146, may be fastened to the drive pulley 129 and the other portion such as inner winding 147 may be fastened to the housing whereby the spring will be wound whenever the pawl 131 is engaged with the ratchet wheel 128.

A brake motor 15, which is part of the Xerox machine, may be coupled to shaft 130 by way of motor pulley 152, belt 153, and shaft pulley 154, to controllably absorb energy stored in the spring 143 during a scan, when the pawl 131 is released at the end of the scan. The motor is an A.C. motor. At the end of a scan, a low level D.C. voltage applied to the rotor provides a light braking action to slow the return to home position ("scan home") caused by the scan return spring. A high level D.C. voltage applied to the rotor toward the end of "scan home" effectively stops the "scan home."

A timing wheel 156, in the form of a pulley, may be journalled to a shaft 156a mounted to upright 12. The drive for wheel 156 is by way of belt 158 driven by pulley 157 fastened to shaft 130. The timing wheel is shown in "home" position and should be understood to rotate clockwise from the position shown, during scan of a card, and to return to the position shown, in a counterclockwise direction during "scan home." The wheel has a lug 159 to which cam 161 is mounted. Behind the wheel and fastened to the upright 12, is a switch mounting plate 162. Several switches engageable by the cam, are mounted to this plate. Switch 163 is a program cam switch for initiating miscellaneous functions in the copying machine, such as initiating paper feed and operating a blower. Switch 164 is the end of scan switch which causes de-energization of the scan solenoid and consequent disengagement of the pawl from the ratchet wheel. Switch 166 is the final brake switch which applies high voltage D.C. to the brake motor at the end of the "scan home." Switch 167 is the home switch for purposes which will become apparent. A fixed stop 168 is provided for engagement by lug 159 at the end of scan home to establish a fixed mechanical reference from which to start scans.

Figure 7:
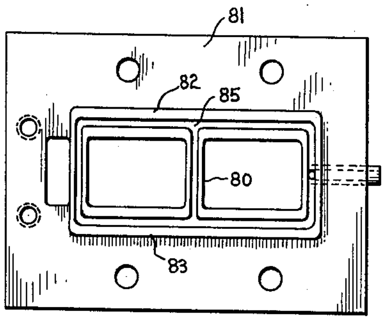
FIG. 7 is a view of the underside of the platen of the embodiment shown in the foregoing figures.

Referring to FIG. 7, the underside of the platen is shown illustrating the arrangement of the various portions of the passageway 85. The face in which passageway 85 is provided, is of a flatness preferably of .001 inch total indicator reading or better. In this way, when the high vacuum is applied to passageway 85 with the film card in place in the carriage, the card can be held against the platen by the vacuum with a like degree of flatness. A typical vacuum is 29 inches of mercury, for example.

An integral rib 80 extending transversely across the opening in the platen can be incorporated where the film cards used have two separate document areas on them separated by a space bearing no information. The rib, therefore, does not interfere with projection of the information on the card, while it provides additional support and flattening effect for the card.

Figure 8:
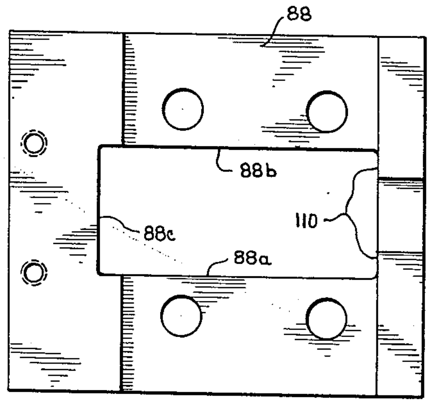
FIG. 8 is a bottom view of the card guide plate employed in the invention.
Figure 9:
FIG. 9 is a side view of the card guide plate.

Referring to FIGS. 8 and 9, the bottom and side views, respectively, of the card guide plate 88 are shown. The bottom view shows the opening 88*a* in which the depending inner portions 82 and 83 of the platen are disposed in assembly. Portions 110 of front wall of the rectangular opening in the plate are shown in the side view to extend somewhat below the level of the portions 88*a* and 88*b* forming side walls of the opening and yet not as far below as the portion 88*c* forming the rear wall. Consequently, as is apparent from the assembly side sectional view in FIG. 11, there is room at the front of the plate above the depressed ramp to readily admit a card between the gates and platen, and yet the portions 110 provide an abutment to stop the card when the card is pushed against the stop by the scan start switch arm.

From FIGS. 8 and 9 it is apparent that the shape of the plate is well suited to receive the gates below the portions 88*a* and 88*b*. This permits movement of the gates transverse to the plate for release of a card when desired, and yet the gates are confined longitudinally of the plate whereby they are moved in unison with the platen and card during traverse of the carriage for the scan operation.

Figure 10:
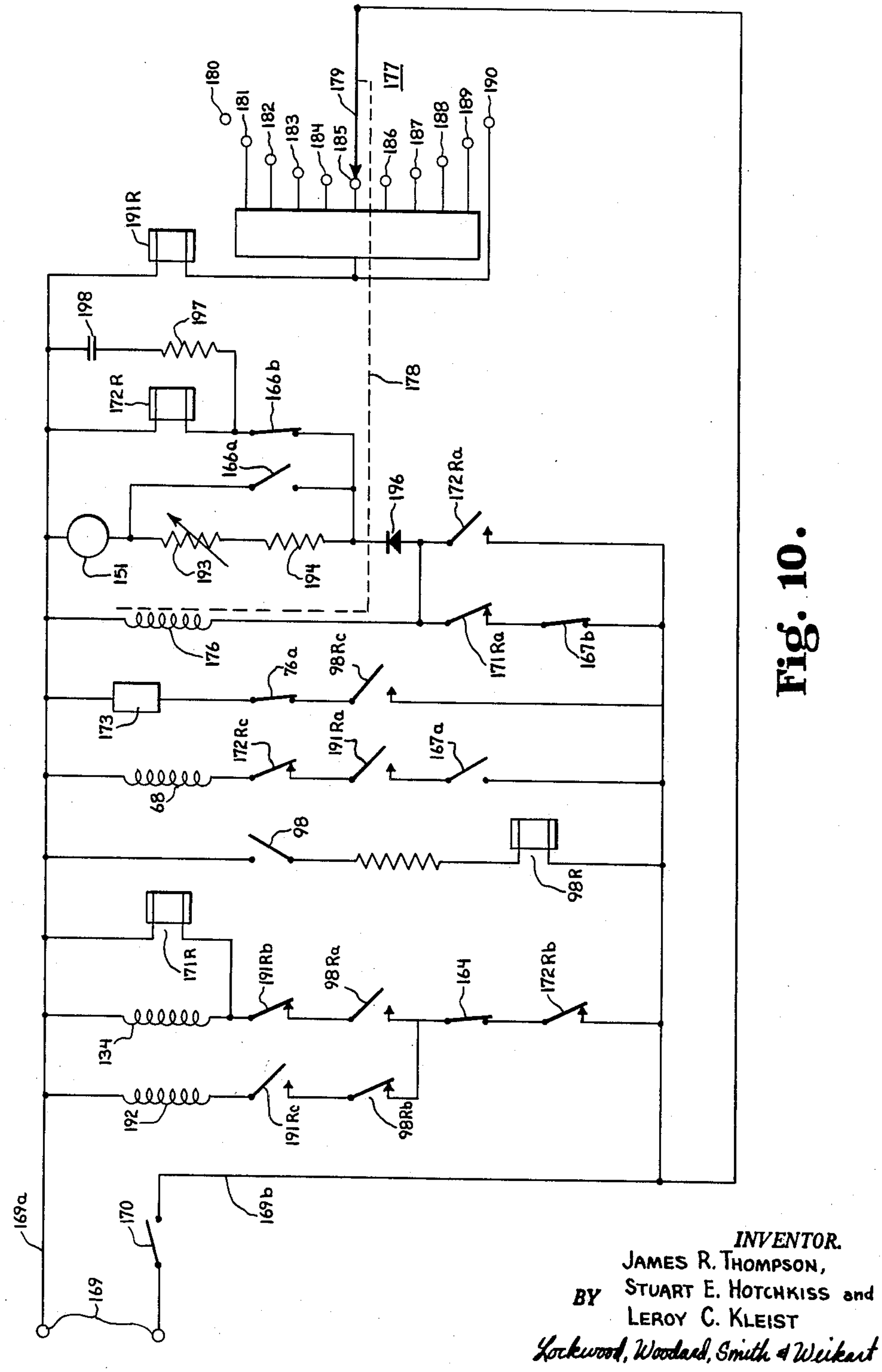
FIG. 10 is a schematic diagram of the reproducing station control circuit.

Referring to the schematic of FIG. 10, components which have already been mentioned herein are given the same reference numerals. Relays, where controlled directly by a specific switch, are given the switch number with the post script R. Various contact sections of the relays are given lower case letter post-scripts in addition to the R.

The circuit is supplied by 115 volt A.C. input to terminals 169. A main power switch 170 is provided. Principal portions of the circuit are the branch including the scan solenoid 134 and brake disabling relay 171R, the branch including the scan start switch 98 and switch relay 98R, the branch including the card release solenoids 68, and solenoid valve 173, the branch including the counter advance solenoid 176, the branch including brake motor 151 and brake sustaining relay 172R and, the branch including the stepping switch 177 and the counter relay 191R.

In addition to the stepping contact 179 of switch 177, fixed contact terminals 180 through 190 are provided. Each of these, with the exception of contact 180, is connected through counter relay 191R, to supply line 169*a*. The stepping contact is connected to supply line 169*b*.

The counter advance solenoid 176 is operatively coupled, as indicated schematically by the dashed line 178, to the stepping contact 179 of the stepping switch. Each energization of the solenoid 176 is, therefore, capable of moving the contact 179 from one of the higher numbered of the fixed contacts 180–190, to the next lower numbered contact. An example of a stepping switch which may be conveniently employed is a series MER "stepper" produced by Guardian Electric Mfg. Co. of Chicago, Illinois.

Referring further to FIG. 10, a print switch or, as it is sometimes called, scan starting switch 98 is shown in series with the scan start relay control winding 98R in a branch across supply lines 169*a*, 169*b*. Scan solenoid winding 134, in parallel with the control winding of brake disabling relay 171R, is connected in series with the normally closed section 191R*b* of counter relay 191R, with the normally open section 98R*a* of scan start relay 98R, with normally closed contacts of the end of scan switch 164, and with the normally closed section 172R*b* of the brake sustaining relay 172R. This combination forms a branch across the supply lines 169*a*, 169*b*.

The counter reset solenoid winding 192 is in a series combination with the normally open section 191R*c* of the counter relay and with the normally closed section 98R*b* of scan start relay 98R. This series combination is connected in parallel with the combination of scan solenoid winding 134, and relay sections 191R*b* and 98R*a*.

Card release gate solenoid 68 is connected in series with the normally closed section 172R*c* of the brake sustaining relay, with normally open section 191R*a* of the counter relay, and with the normally open contacts 167*a* of the home switch 176 of FIG. 3.

The valve solenoid 173 is in series with the normally closed contacts 76*a* of the limit switch 76 of FIG. 12 and with the normally open section 98R*c* of the scan start, or print, relay 98R.

Counter advance solenoid 176 is in series with normally closed brake disabling relay section 171R*a* and with the normally closed contacts 167*b* of home switch 167. This series group is connected in a branch across lines 169*a*, 169*b*.

The brake circuit branch includes the brake motor 151 in series with variable and fixed resistances 193 and 194 respectively, with rectifier 196, and with normally-open section 172R*a* of the brake sustaining relay 172R.

Section 172R*a* is connected across the combination of relay section 171R*a* and home switch section 167*b*. Normally-open contacts 166*a* of full-brake switch 166 are connected across the series resistances 193, 194.

A second portion of the brake circuit is connected across the combination of brake motor 151 and contacts 166*a* of the brake switch. This portion includes the brake sustaining relay control winding 172R in series with normally-closed contacts 166*b* of the full brake switch 166. An R-C time delay branch including resistor 197 and capacitor 198, is connected across relay winding 172R.

In FIGS. 11 and 12, the platen 301, instead of being rigidly fastened to card guide plate 88, is spring mounted. Spring plate 302 is fastened securely to the scan start switch bracket 298 by two screws 303 which are threadedly received in the card guide plate 88. A pair of screws 304 fastens the platen to the spring plate 302, vertical clearance as at 308 being provided between the card guide plate and all portions of the platen projecting horizontally over any portion of the card guide plate. It should be apparent therefore, that the plate 302 constitutes a spring hinge whereby the platen can be depressed generally pivotally with respect to the hinge 302, toward the card guide plate. Gear racks 84 and 86 are fastened to the platen in the same manner as with platen 81 of the embodiment first described.

When a card 38*i* has entered the carriage and has been positioned against the stops 110 as shown in FIG. 11, by the scan start switch operating arm pad 102, rack drive pinions 92, being engaged with the racks, drive the carriage. The gear tooth separating force between the pinions and the racks, depresses the platen as the carriage is driven, to firmly engage and flatten the card 38*i* between the platen 301 and card guide plate 88.

*Operation*

In the operation of the invention, assume that a setting has been made in the control center so that the reading station of FIG. 1 will respond to cards on the conveyor having certain documentary information or identification characteristics thereon. Upon recognizing one such card to be reproduced, the reading station will produce a first electrical signal pulse to the ramp solenoid 126 causing the ramp to descend between the belts and deflect the card upwardly from the belts.

The kinetic energy of the card carries it up the ramp, over the inclined forward edges of the gates, and the card is guided along the upper surface of the gates by the lower surfaces of the inner portions 82 and 83 of the platen.

As the leading edge of the card reaches the rear edges of the gates and platen inner portions, it pushes the forward end 102 of the scan start switch actuating arm to the rear. This arm being spring loaded, absorbs the energy of the card, bringing it to rest and then moves the card forward so that the trailing edge thereof abuts the depending abutment 110 and there holds the card firmly in position.

The scan start switch 98 energizes relay 98R closing section 98R*a* to energize solenoid 134 and to energize brake disabling relay 171R. Energization of solenoid 134 causes pawl 131 to engage the ratchet wheel 128 initiating the drive of the carriage drive pulley 97. Pulley 97 drives shaft 93. Pinions 92, fastened to shaft 93, being engaged with the gear racks 84, 86 mounted on the platen, initiate traverse of the carriage.

As the carriage is moved, the lamp 111 and the projection lens assembly 127 project an image of the portion of the card appearing above aperture 113. Thus, the card is "scanned" as the carriage moves it along. By employing a fixed optical system in the copying machine, the image can be projected on the coated drum as it rotates in synchronism with the traverse of the carriage, though the drum may have a surface speed of perhaps thirty times that of the carriage, depending upon the magnification desired.

Of course, in a copying machine using sensitized paper as the photosensitive member, the paper moving mechanism synchronizes paper movement with the carriage.

When the carriage has moved a distance sufficient to project the documentary information on the card, the time wheel 156 will be advanced far enough for the cam 161 thereon to open the end of scan switch 164. This de-energizes scan solenoid 135, whereupon the pawl 131 is disengaged. It also de-energizes brake disabling relay 171R whereupon section 171R*a* in the brake circuit closes applying a low level D.C. to the brake motor 151 and energizing brake sustaining relay 172R. The scan return spring 143 returns the carriage to its initial "home" position. This is the "scan home" phase of operation.

Energization of brake sustaining relay 172R closes section 172R*a* thus assuring a power supply to the brake motor independent of relay section 171R*a* and home switch section 167*b*. Energization of relay 172R also opens the normally closed section 172R*b* whereby de-energization of scan solenoid 134 and brake disabling relay 171R is assured during the "scan home" phase.

Momentarily before reaching the home position, cam 161 operates the brake switch 166 closing section 166*a* to apply full D.C. voltage to the brake motor 151 to stop the carriage at home. Operation of switch 166 also opens section 166*b* which would de-energize relay 172R but for a time delay of approximately .2 sec. provided by the R-C branch in parallel with the relay. Consequently, relay section 172R*a* remains closed long enough for full brake voltage through switch section 166*a* to cause brake motor 151 to stop the carriage at home. During "scan home," relay 172R, being energized, maintains open the normally closed relay section 172R*c* to prevent operation of the card release solenoid 98 until the carriage is home.

When the carriage is home, brake switch 166 is still actuated by a portion of cam 161 by virtue of the location of the switch close to the home position. Relay 172R therefore opens at the end of the time delay and section 172R*c* thereof in the gate solenoid branch, closes.

At home position, timing cam 161 actuates home switch 167 opening section 167*b* in the brake circuit and closing section 167*a* in the gate solenoid circuit. Thus, relay section 172R*c* and switch section 167*a* are now closed in the gate solenoid circuit.

During the scan home portion of the cycle, the counter and stepping switch advance solenoid 176, which is connected in parallel with part of the brake circuit, is energized, advancing the stepping switch one step.

If only one copy was desired, the advance of one step places contactor 177 on terminal 180 whereupon counter relay 191R is de-energized. This closes relay section 191R*a* during the "scan home" portion of the cycle. Consequently, upon return to home position, by the closing of the home switch section 167R*a* and brake sustaining relay section 172R*c*, the circuit through gate solenoid 68 is completed whereupon the gates are opened to release the card. The valve solenoid 173 is deenergized upon actuation of limit switch 76 by crank 64 upon the opening of the gates which actuation opens switch section 76*a*. This switches the platen supply valve to change from a high vacuum at the platen to a slight pressure, to eject the card to the belt whereby it is carried away to a card receiving station.

It may be mentioned at this point that deenergization of counter relay 191R closes section 191R*c* whereby the counter reset solenoid is energized to reset the copy counter to zero. It also opens section 191R*b*. Therefore, while the brake sustaining relay section 172R*b* again closes when the relay 172R is deenergized after the aforementioned time delay, the opening of section 191R*b* prevents reenergization of the pawl solenoid 134. Thus, a new scan is not started, upon completion of the one required for one copy.

If more than one copy is desired, the control center may be set to make the desired number of copies. Assuming that five copies are desired, the control center is set for five copies. Referring to the schematic of FIG. 10, this places the movable contact of the stepping switch on terminal 185. It should be apparent therefore that counter advance solenoid 176 moves the stepping switch one step at a time during each "scan home" until it has been returned to terminal 180.

So long as counter relay 191R remains energized, section 191R*a* thereof will remain in its normally open position, avoiding actuation of the card release gate solenoid 68. Moreover, section 191R*b* in the scan solenoid branch will remain closed. Therefore, each time the carriage has returned to "home position," and brake sustaining relay section 172R*b* has again closed, the scan solenoid is reenergized and a new scan is initiated for the same film card, and the scan and scan-home are repeated. Repetitions will occur until the movable contact of the stepping switch has been returned by the counter advance solenoid 176 to terminal 180, whereupon the card will be released upon completion of "scan home" in the same manner as discussed above in the description concerning production of only one copy.

It has been mentioned above, that the platen shown with a transverse rib accommodates use of a film card having two separate documents thereon. If it were desired to reproduce only one of the two documents, an additional "end of scan switch" could be provided whereby both document areas of a card would not have to be scanned if a copy of only one of the two documents on the card, was desired. This is just one example of the modifications which could readily be made and which remain within the scope of the invention.

The present invention has been herein disclosed as particularly desirable for reproducing processes employing scanning, thus taking advantage of the benefits to be derived from such processes such as, for example, the minimal space requirement of equipment involved. It should nevertheless be noted that this invention can also be employed with copying equipment of the stationary or non-scanning type. Considerable simplification of the illustrated embodiment of this invention could be obtained by elimination of the scanning feature. However, the result would remain within the scope of this invention.

While the invention has been disclosed and described in some detail in the drawings and foregoing description, they are to be considered as illustrative and no restrictive in character, as modifications may readily suggest themselves to persons skilled in this art and within the broad scope of the invention, reference being had to the appended claims.

We claim:

1. In combination for use with a first plurality of cards to obtain a reproduction of information from selective cards in the plurality where each of the cards in the first plurality has a plurality of bits of information and where the information on the selective cards is transferred to cards in a second plurality, a conveyor constructed to obtain a movement of the cards at a relatively high speed, means disposed relative to the cards on the conveyor for retaining the cards on the conveyor during the movement of the cards at the relatively high speed, ramp means selectively movable between a first position displaced from the cards in the conveyor and a second position operatively coupled to the cards on the conveyor for obtaining a transfer of cards from the conveyor in the second position of the ramp means, the ramp means being selectively movable between the first and second positions in accordance with information processed on the cards, a carriage disposed relative to the ramp means for receiving the selective cards transferred from the conveyor to the ramp means, a switch arm disposed relative to the carriage to damp the movement of the selective cards along the carriage after the transfer of the selective cards from the conveyor to the carriage, means including the switch arm for initiating the movement of the cards by the carriage at a relatively low speed upon the actuation of the switch arm by each selective card transferred to the carriage, and means operatively coupled to the last mentioned means for obtaining a reproduction of information to the cards in the second plurality from each selective card transferred to the carriage.

2. The combination set forth in claim 1 wherein means are operatively coupled to the carriage for obtaining a return of each selective card from the carriage to the conveyor upon the reproduction of information from that card to cards in the second plurality.

3. In combination for use with a first plurality of cards to obtain a reproduction by reproducing means of information from selective cards in the plurality where each of the cards in the first plurality has a plurality of bits of information and where the information on the selective cards is transferred to cards in a second plurality, a conveyor constructed to obtain a movement of the cards at a first speed, means disposed relative to the cards on the conveyor for retaining the cards on the conveyor, ramp means selectively movable between first and second positions in accordance with information processed on the cards and disposed relative to the conveyor in the first position to prevent any transfer of cards in the first position and disposed relative to the conveyor in the second position to obtain a transfer of the selective cards from the conveyor, carriage means responsive to the transfer of the selective cards from the conveyor for obtaining a relative movement of the cards and the reproducing means at a relatively low speed, and means responsive to the movement of the cards at a relatively low speed on the carriage for obtaining a reproduction of information from the selective cards on the carriage to the cards in the second plurality.

4. The combination set forth in claim 3 wherein means are responsive to the reproduction of information from the selective cards in the first plurality to the cards in the second plurality for obtaining a return of the selective cards from the carriage to the conveyor.

5. In combination for use with a first plurality of cards to obtain a reproduction of information from selective cards in the plurality where each of the cards in the first plurality has a plurality of bits of information and where the information on the selective cards is transferred to cards in a second plurality, means for obtaining a reproduction of information on the selective cards in the first plurality to the cards in the second plurality, conveyor means constructed to obtain a movement of the cards in the first plurality at a first particular speed, carriage means displaced from the conveyor means and constructed to obtain a movement of the selective cards in the first plurality at a second particular speed different from the first particular speed, ramp means disposed relative to the conveyor means and the carriage means for obtaining a transfer of the selective cards in the first plurality from the conveyor means to the carriage means.

means responsive to the transfer of the selective cards to the carriage means for initiating a relative movement between the selective cards and the reproducing means at the second particular speed, and means responsive to the movement of the selective cards at the second particular speed for obtaining a reproduction on the cards in the second plurality of the information on the selective cards in the first plurality.

6. The combination set forth in claim 5 wherein means are included for obtaining a transfer of the selective cards from the carriage means to the conveyor means upon the reproduction on the cards in the second plurality of the information on the selective cards.

7. In combination for use with a first plurality of cards to obtain a reproduction of information from selective cards in the plurality where each of the cards in the first plurality has a plurality of bits of information and where the information on the selective cards is transferred to cards in a second plurality, conveyor means constructed to obtain a movement of the cards at a first particular speed, carriage means constructed to obtain a movement of the cards at a second particular speed less than the first particular speed, means movable between first and second positions in accordance with information processed on the cards and disposed in the first position to prevent a transfer of cards in the first plurality from the conveyor means to the carriage means and disposed in the second position to obtain a transfer of the selective cards in the first plurality from the conveyor means to the carriage means, a switch arm constructed to receive the selective cards in the first plurality after the transfer of such cards from the conveyor means to the carriage means and to damp the movement of such cards on the carriage means, means including the switch arm for obtaining a movement of the carriage in a particular direction at the second particular speed from a particular position upon the movement of such cards to the switch arm and for obtaining a return of the carriage to the particular position for the initiation of a new movement of the carriage in the particular direction at the particular speed, and means responsive to each movement of the carriage at the second particular speed in the particular direction for obtaining a reproduction of the information on the second particular cards to the cards in the second plurality.

8. The combination set forth in claim 7 wherein means are included to obtain a return of the selective cards in the first plurality from the carriage to the conveyor upon the reproduction on a particular number of the cards in the second plurality of the information on each selective card in the first plurality.

9. In combination for use with a first plurality of cards to obtain a reproduction by reproducing means of information from selective cards in the plurality where each of the cards in the first plurality has a plurality of bits of information and where the information on the selective cards is transferred to cards in a second plurality, first means constructed to hold the cards in the first plurality, second means operatively coupled to the first means for obtaining a selective transfer of the cards in the first plurality from the first means, third means disposed relative to the first means for receiving the cards transferred from the first means and constructed to obtain a movement of such cards at a first particular speed, fourth means disposed relative to the first means for reading particular information on the cards transferred from the first means to the third means to obtain a selection of the cards in the first plurality, fifth means operatively coupled to the fourth means and disposed relative to the third means for obtaining a transfer of the selective cards from the third means, sixth means disposed relative to the fifth means to receive the selective cards transferred by the fifth means and constructed to obtain a relative movement between the cards and the reproducing means at a second particular speed different than the first particular speed, and seventh means operatively coupled to the sixth means for obtaining a reproduction of the information on the selective cards to the cards in the second plurality during the movement of the sixth means at the second particular speed.

10. The combination set forth in claim 9 wherein means are included to prevent the transfer of cards from the first means upon the disposition of the fifth means to prevent the transfer of the selective cards to the fifth means from the third means.

11. The combination set forth in claim 9 wherein means are included to prevent the transfer of cards from the first means during the reproduction of information from the selective ones of the cards in the first plurality.

12. In combination for use with a first plurality of cards to obtain a reproduction of information from selective cards in the plurality where each of the cards in the first plurality has a plurality of bits of information and where the information on the selective cards is transferred to cards in a second plurality, means for obtaining a reproduction of information on the selective cards in the first plurality to cards in the second plurality, first means constructed to hold the cards in the first plurality, second means operatively coupled to the first means for obtaining a selective transfer of the cards in the first plurality from the first means, third means disposed relative to the first means for receiving the cards transferred from the first means and constructed to obtain a movement of such cards, fourth means disposed relative to the first means for reading particular information on the cards transferred from the first means to the third means to obtain a selection of the cards in the first plurality, fifth means operatively coupled to the fourth means and disposed relative to the third means for obtaining a transfer of the selective cards from the third means, sixth means disposed relative to the fifth means to receive the selective cards transferred by the fifth means and constructed to obtain a relative displacement between the cards and the reproducing means through a particular distance in a particular direction from an initial position, seventh means operatively coupled to the sixth means for obtaining a reproduction of the informaiton on the selective cards to the cards in the second plurality during the movement of the sixth means in the particular direction, eighth means responsive to each movement of the sixth means through the particular distance in the particular direction for returning the sixth means to its initial position for the initiation of a new movement in the particular direction and for the reproduction of information from the selective cards to successive ones of the cards in the second plurality and ninth means responsive to the duplication of information from each selective card in the plurality to a particular number of the cards in the second plurality for returning the selective card from the sixth means to the third means.

13. The combination set forth in claim 12 wherein damping means are responsive to the movement of each selective card from the third means to the sixth means for damping the movement of the selective card along the sixth means and for returning the selective card to the initial position for a movement of the card in the particular direction through the particular distance and for the reproduction of the information on the card during such movement and wherein the damping means is included in electrical circuitry for initiating the operation of the sixth, seventh and eighth means.

14. In a card handling system: a conveyor transporting a card between spaced points; means to intercept the card on the conveyor for removal thereof from the conveyor; a receiver to receive a card removed from the conveyor and including separable gates disposed to support a card in the receiver, a platen disposed to face a card in the receiver and having a passageway therein communicable with a source of vacuum to secure a card to said platen, and a switch having an actuator operable by motion of a card in the receiver relative to said receiver, said switch actuator being biased to move the card to a predetermined position in the receiver after movement of the actuator by the card; illuminating means for applying light to a card in the receiver; means for driving said receiver with a card secured therein whereby the card can be scanned by light from said illuminating means; and a copying machine having a photosensitive member therein coupled to said means for driving the receiver for movement in synchronism with said receiver, said member being disposed to receive light during scanning of a card by light from said illuminating means.

15. In a card handling system: a conveyor transporting a card between spaced points; means to intercept the card on the conveyor for removal thereof from the conveyor; a receiver to receive a card removed from the conveyor; illuminating means for applying light to a card in the receiver; a lens for receiving light from the illuminated card and projecting light so received; means for driving said receiver with a card secured therein whereby the card can be scanned by light from said illuminating means; a copying machine having a photosensitive member therein coupled to said means for driving the receiver for movement in synchronism with said receiver and disposed to receive light projected by said lens during scanning of a card by light from said illuminating means; means coupled to said receiver to release a card from the receiver to the conveyor; and means coupled to said driving means and to said card release means to provide a selectably predetermined number of scans of a card before release to the conveyor.

16. In a card handling system: a conveyor transporting a card between spaced points; a ramp in the path of the card on the conveyor to intercept the card for removal thereof from the conveyor; a receiver adjacent the ramp to receive a card removed from the conveyor and including separable gates disposed to support a card during entry into the receiver, a platen disposed to face a card in the receiver and having a passageway therein communicable with a source of vacuum to secure a card to said flat surface, and a switch having an actuator operable by motion of a card in the receiver relative to said receiver, said switch actuator being biased to move the card to a predetermined position in the receiver after movement of the actuator by the card; illuminating means for applying light to a card in the receiver and having an aperture for restricting illumination to a limited portion of the card at a time; a lens for receiving light from the illuminated portion of a card and projecting light so received; means for driving said receiver with a card secured therein whereby the card can be scanned by light from said illuminating means, driving action of said means being initiated by said switch upon operation thereof by motion of the card; a copying machine having a photosensitive member therein coupled to said means for driving the receiver for movement in synchronism with said receiver, said member being disposed to receive light projected by said lens during scanning of a card by light from said illuminating means; and actuator means coupled to said gates to separate said gates and release a card from the receiver to the conveyor.

References Cited by the Examiner

UNITED STATES PATENTS

| | | | |
|---|---|---|---|
| 1,980,188 | 11/34 | Cullen et al. | 271—74 |
| 2,703,280 | 3/55 | Butterfield et al. | 88—24 X |
| 2,741,960 | 4/56 | Oldenbloom | 88—24 X |
| 2,804,974 | 9/57 | Noon. | |
| 2,822,172 | 2/58 | Mayo et al. | 271—74 |
| 2,911,884 | 11/59 | Caudle et al. | 271—74 X |
| 2,981,411 | 4/61 | Azari. | |
| 2,986,967 | 6/61 | Albert et al. | 88—24 |
| 3,062,096 | 11/62 | Brown | 88—24 |

NORTON ANSHER, *Primary Examiner.*

WILLIAM MISIEK, *Examiner.*